United States Patent
Hsu et al.

(10) Patent No.: US 10,496,505 B2
(45) Date of Patent: Dec. 3, 2019

(54) INTEGRATED CIRCUIT TEST METHOD

(71) Applicant: REALTEK SEMICONDUCTOR CORPORATION, Hsinchu (TW)

(72) Inventors: Wen-Hsuan Hsu, Changhua County (TW); Ying-Yen Chen, Hsinchu (TW); Cheng-Yan Wen, New Taipei (TW); Chia-Tso Chao, Hsinchu (TW); Jih-Nung Lee, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 240 days.

(21) Appl. No.: 15/833,411

(22) Filed: Dec. 6, 2017

(65) Prior Publication Data
US 2018/0181477 A1 Jun. 28, 2018

(30) Foreign Application Priority Data
Dec. 27, 2016 (TW) .............................. 105143271 A (51) Int. Cl.
| | | |
|---|---|---|
| G01R 31/02 | (2006.01) | |
| G01R 31/26 | (2014.01) | |
| G06F 11/263 | (2006.01) | |
| G06F 11/22 | (2006.01) | |

(52) U.S. Cl.
CPC ........ *G06F 11/263* (2013.01); *G06F 11/2236* (2013.01)

(58) Field of Classification Search
CPC ............ G01R 31/2843; G01R 31/2853; G01R 31/3008; G01R 31/3012; G06F 11/263; G06F 11/2236; G11C 29/56
See application file for complete search history.

(56) References Cited

U.S. PATENT DOCUMENTS

| | | | | |
|---|---|---|---|---|
| 6,889,164 B2* | 5/2005 | Okuda | ............... | G01R 31/3008 324/762.05 |
| 7,064,570 B2* | 6/2006 | Buffet | ............... | G01R 31/2843 324/762.02 |
| 7,089,514 B2* | 8/2006 | Adkisson | ......... | G01R 31/31718 702/35 |
| 7,557,598 B2* | 7/2009 | Ochiai | ............... | G01R 31/3008 324/522 |

* cited by examiner

*Primary Examiner* — Minh N Tang
(74) *Attorney, Agent, or Firm* — WPAT, PC (57) ABSTRACT

The present invention discloses an IC test method including the following steps: generating N test patterns; testing each of M chip(s) according to the N test patterns so as to generate N×M records of quiescent DC current (IDDQ) data; generating N reference values according to the N×M records, in which each of the N reference values is generated according to M record(s) of the N×M records, and the M record(s) and the reference value generated thereupon are related to the same one of the N test patterns; obtaining a reference order of the N test patterns according to the N reference values and a sorting rule; reordering the N×M records by the reference order so as to obtain reordered N×M records; generating an IDDQ range according to the reordered N×M records; and determining whether any of the M chip(s) is defective based on the IDDQ range.

10 Claims, 13 Drawing Sheets

S1010 — determining whether a standard deviation of each of the (N-1) delta IDDQ groups in step S710 reaches a threshold; and when a standard deviation of a certain group of the (N-1) delta IDDQ groups reaches the threshold, removing the certain group from the (N-1) delta IDDQ groups and generating the IDDQ range according to the rest of the (N-1) delta IDDQ groups

INTEGRATED CIRCUIT TEST METHOD

BACKGROUND OF THE INVENTION

1. Field of the Invention

The present invention relates to a test method, especially to an IC test method.

2. Description of Related Art

In order to ensure the quality of an IC, a lot of IC tests should be carried out. A quiescent DC current (IDDQ) test is a common test for finding out whether an IC (e.g., a CMOS IC) has defects. For a normal IC, the leakage current will be small under a quiescent state; for a defective IC, the defects thereof will make an element (e.g., a COMS element) and a power source (VDD)/a ground (GND) short-circuited, and consequently a large DC leakage current from the power source to the ground will be detected under the quiescent state. The detection of such large leakage current implies that the tested IC is detective. The mentioned quiescent state is a state that a circuit is not in a switching state while the input of this circuit is kept unchanged.

However, as the development of IC processes move on, the scale of IC is reduced, and IDDQ of IC is consequently reduced and looks like a general leakage current. Therefore, a conventional IDDQ test may be unable to accurately distinguish a normal IC form an abnormal IC. In view of this problem, some conventional art makes use of differences between IDDQ (delta IDDQ) to detect IC defects in accordance with the analysis of variation trends of IDDQ under different test patterns. Those of ordinary skill in the art can appreciate that for the same chip, a value of delta IDDQ is usually obtained by subtracting an IDDQ value of a preceding test pattern (e.g., $(X-1)^{th}$ test pattern of N test patterns that are used to test the chip in turn) from an IDDQ value of a current test pattern (e.g., $X^{th}$ test pattern of N test patterns that are used to test the chip in turn).

Based on the above, though delta IDDQ is used for analysis, since each delta IDDQ value for a chip is generated according to the difference between two IDDQ values of two successive test patterns, if the two successive test patterns have random or unsorted influences on IDDQ values of the chip, the distribution of all delta IDDQ values of the chip will be random or unsorted. As a result, the analysis generated according to such delta IDDQ distribution is probably unreliable, which may lead to a normal/abnormal IC mistaken for an abnormal/normal IC.

SUMMARY OF THE INVENTION

In consideration of the problems of the prior art, an object of the present invention is to provide an IC test method capable of improving the reliability of an IDDQ test.

The present invention discloses an IC test method. An embodiment of the IC test method includes the following steps: generating N test patterns, in which the N is an integer greater than one; testing each of M chip(s) according to the N test patterns so as to generate N×M records, in which the N×M records are quiescent DC current (IDDQ) data and the M is a positive integer; generating a reference value according to M record(s) of the N×M records for each of the N test patterns and thereby obtaining N reference values, in which the M record(s) and the reference value generated thereupon are related to a same one of the N test patterns; obtaining a reference order of the N test patterns according to the N reference values and a predetermined sorting rule; reordering the N×M records by the reference order so as to obtain reordered N×M records; generating an IDDQ range according to the reordered N×M records; and determining whether any of the M chip(s) is defective based on the IDDQ range.

Another embodiment of the aforementioned IC test method includes the following steps: generating N test patterns, in which the N is an integer greater than one; testing chips according to the N test patterns so as to generate a delta quiescent DC current (IDDQ) distribution of the chips, in which the step of testing the chips includes testing a first chip of the chips according to the N test patterns for generating N records of IDDQ data and includes generating N delta IDDQ records according to the N records; determining whether the delta IDDQ distribution includes at least two groups; and if the delta IDDQ distribution includes the at least two groups, generating an IDDQ range of the first chip according to the N' delta IDDQ records, and checking the N' delta IDDQ records by the IDDQ range so as to determine whether the first chip is defective. The mentioned N' is equal to the N or (N−1).

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present invention discloses an integrated circuit (IC) test method capable of accurately determining whether an IC is defective in comparison with the prior art.

Figure 1:
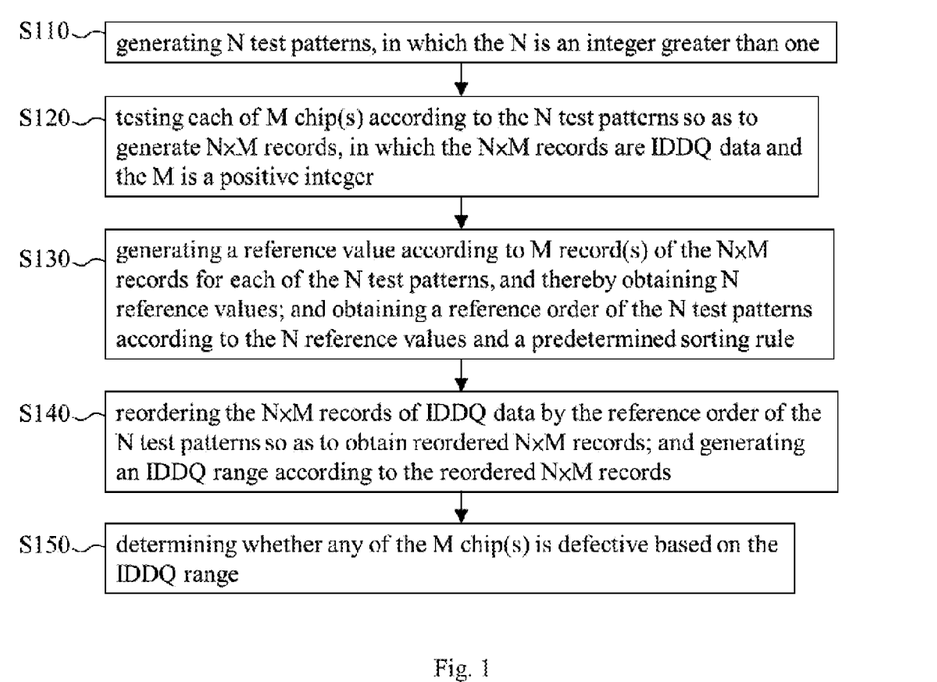
FIG. 1 shows an embodiment of the IC test method of the present invention.

Please refer to FIG. 1 which shows an embodiment of the IC test method of the present invention. As shown in FIG. 1, the embodiment includes the following steps:

Step S110: generating N test patterns (i.e., N sets of test signals, each set corresponding to one kind of circuit operation setting), in which the N is an integer greater than one. In an exemplary implementation of this step, an automatic test pattern generator (ATPG) is used to generate the N test patterns and output these patterns to automatic test equipment (ATE). The said ATPG and ATE are known in this industrial field, and thus their details are omitted here.

Figure 2:
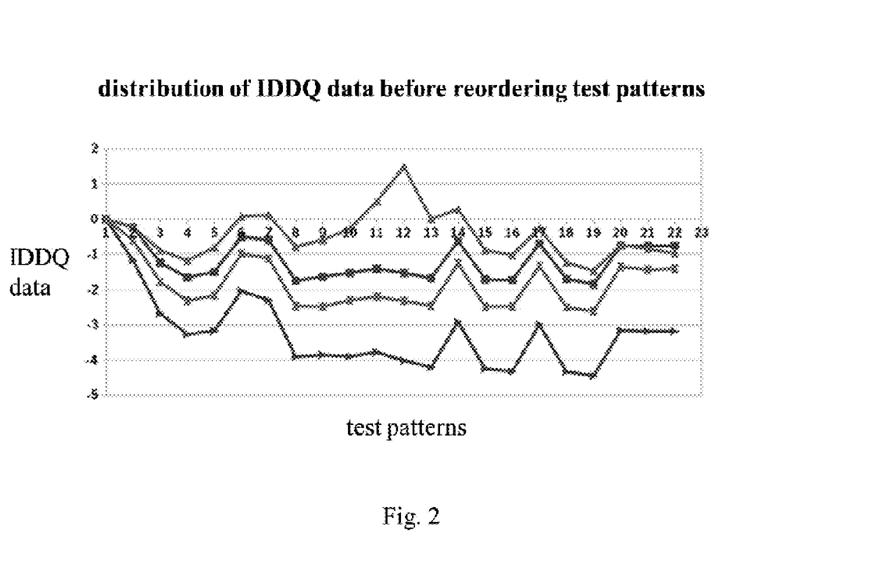
FIG. 2 shows a distribution of IDDQ data before reordering test patterns.

Step S120: testing each of M chip(s) according to the N test patterns so as to generate N×M records, in which the N×M records are quiescent DC current (IDDQ) data and the M is a positive integer. More specifically, each of the M chip(s) is related to N records of the N×M records, and the N records are generated in accordance with the N test patterns respectively; and each of the N test patterns is related to M record(s) of the N×M records, and the M record(s) is/are generated by testing the M chip(s) respectively. An exemplary implementation of this step is carried out by the aforementioned ATE. FIG. 2 shows an exemplary distribution of the N×M records of IDDQ data generated by step S120. In FIG. 2, different numbers along the transverse axis stand for different test patterns respectively, numbers along the longitudinal axis stand for values (milliampere, mA) of IDDQ data, and different styles of lines (accompanied with different symbols such as triangle, rectangle, etc.) stand for different tested chips respectively.

Step S130: generating a reference value according to M record(s) of the N×M records for each of the N test patterns and thereby obtaining N reference values, in which the M record(s) and the reference value generated thereupon are related to one of the N test patterns while the M record(s) are those generated by testing the M chip(s) according to the said one of the N test patterns; and then obtaining a reference order of the N test patterns according to the N reference values and a predetermined sorting rule. An embodiment of generating the above-mentioned reference value includes: generating the reference value according to an average of the M record(s) and according to K times a standard deviation of the M record(s), in which the K is an integer or a fraction. An example of the K is a positive number; another example of the K is a negative number provided that an implementation with such K is practicable. An embodiment of obtaining the reference order includes sorting the N reference values by the predetermined sorting rule. An example of the predetermined sorting rule is an ascending sorting rule; however, other rules such as a descending rule can be adopted. An exemplary implementation of step S130 is carried out by a computing apparatus (e.g., computer).

Figure 3:
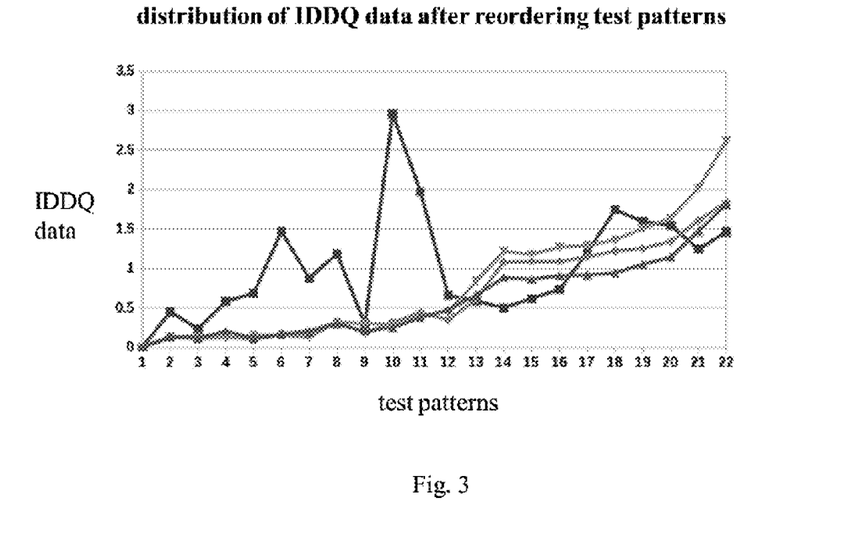
FIG. 3 shows a distribution of IDDQ data after reordering test patterns.

Step S140: reordering (i.e., rearranging) the N×M records of IDDQ data by the reference order of the N test patterns so as to obtain reordered N×M records; and generating an IDDQ range according to the reordered N×M records. An exemplary implementation of this step is carried out by a computing apparatus (e.g., computer). FIG. 3 shows an exemplary distribution of the reordered N×M records that are obtained by reordering the N×M records of FIG. 2. In comparison with FIG. 2, FIG. 3 clearly shows the difference of IDDQ data between chips.

Step S150: determining whether any of the M chip(s) is defective based on the IDDQ range. For instance, this step may calculate derivatives (e.g., the N'×M delta IDDQ records in the later paragraph) of the N×M records of IDDQ data and thereby determine a chip with a derivative outside the IDDQ range to be a defective one. An exemplary implementation of step S150 is carried out by the aforementioned ATE.

Figure 4:
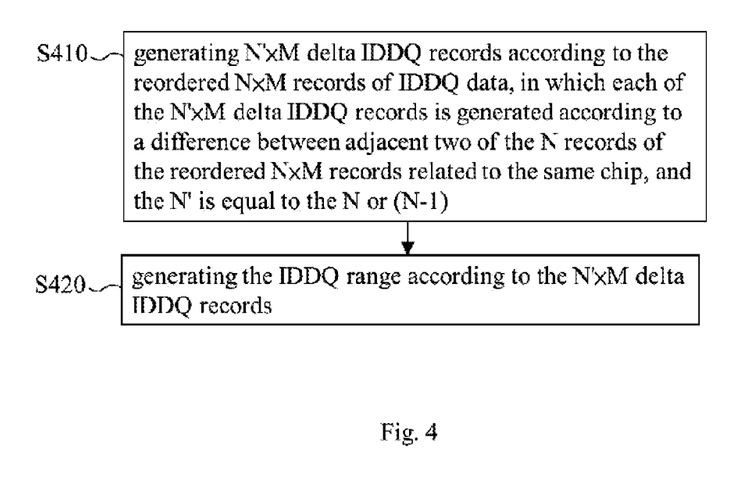
FIG. 4 shows an exemplary implementation of determining the IDDQ range of FIG. 1.
Figure 5:
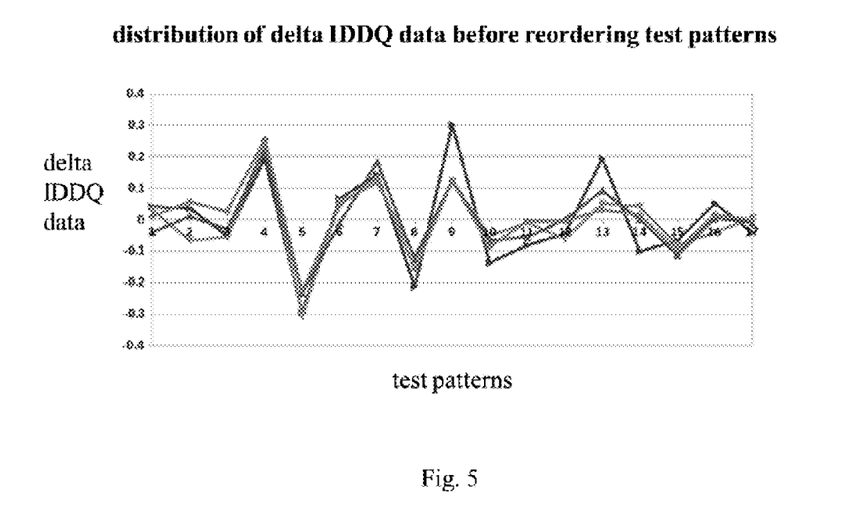
FIG. 5 shows a distribution of delta IDDQ data before reordering test patterns.
Figure 6:
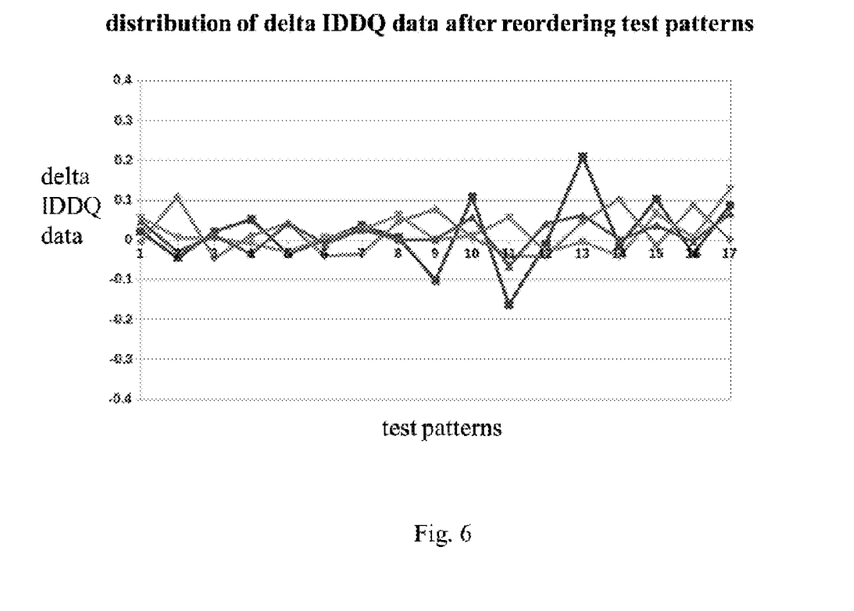
FIG. 6 shows a distribution of delta IDDQ data after reordering test patterns.

Please refer to FIG. 4. In step S410, an exemplary implementation of generating the IDDQ range includes:

Step S410: generating N'×M delta IDDQ records (i.e., N'×M records of delta IDDQ data) according to the reordered N×M records of IDDQ data, in which each of the N'×M delta IDDQ records is generated according to a difference between adjacent two of the N records of the reordered N×M records related to the same one of the M chip(s), and the N' is equal to the N or (N−1). FIG. 5 shows an exemplary distribution of delta IDDQ records that are generated according to original N×M records of IDDQ data, and FIG. 6 shows an exemplary distribution of delta IDDQ records that are generated according to the reordered version of the same N×M records of IDDQ data. In comparison with FIG. 5, FIG. 6 clearly shows the difference of delta IDDQ data between chips.

Step S420: generating the IDDQ range according to the N'×M delta IDDQ records. This step can may generate the IDDQ range according to the average of the N'×M delta IDDQ records and according to K times the standard deviation of the N'×M delta IDDQ records, in which the K is an integer (e.g., an integer between 3 and 9) or a fraction. For instance, an upper limit of the IDDQ range is the average of the N'×M delta IDDQ records plus six times the standard deviation of the N'×M delta IDDQ records (i.e., the average+6×standard deviation), and an lower limit of the IDDQ range is the average minus six times the standard deviation (i.e., the average−6×standard deviation).

Figure 7:
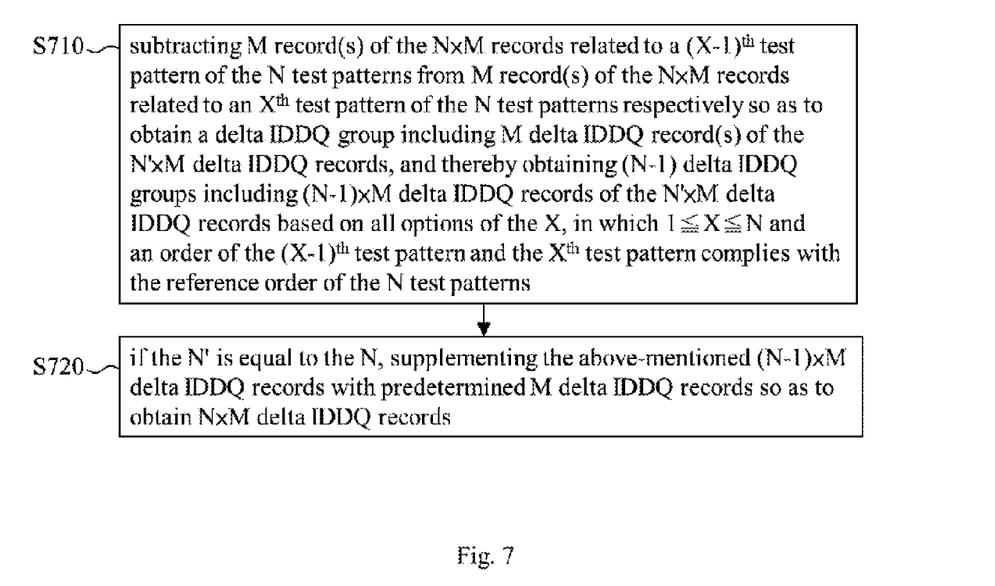
FIG. 7 shows an exemplary implementation of the step S410 of FIG. 4.

Please refer to FIG. 7. An embodiment of step S410 includes:

Step S710: subtracting M record(s) of the N×M records related to a $(X-1)^{th}$ test pattern of the N test patterns from M record(s) of the N×M records related to an $X^{th}$ test pattern of the N test patterns respectively so as to obtain a delta IDDQ group including M delta IDDQ record(s) of the N'×M delta IDDQ records, and accordingly obtaining (N−1) delta IDDQ groups including (N−1)×M delta IDDQ records of the N'×M delta IDDQ records based on all options of the X, in which the X is an integer between one and the N (i.e., $1 \leq X \leq N$), and an order of the $(X-1)^{th}$ test pattern and the $X^{th}$ test pattern complies with the reference order of the N test patterns. For instance, if the M records related to the $X^{th}$ test pattern of the N test patterns are 0.5, 0.4, 0.6, 0.3 and the M records related to the $(X-1)^{th}$ test pattern of the N test patterns are 0.3, 0.4, 0.3, 0.5, the delta IDDQ group derived therefrom includes M delta IDDQ records as follows: 0.2 (0.5−0.3), 0 (0.4−0.4), 0.3 (0.6−0.3), −0.2 (0.3−0.5).

Step S720: if the N' is equal to the N, supplementing the above-mentioned (N−1)×M delta IDDQ records with M delta IDDQ records that are obtained in a predetermined manner (e.g., predetermined M delta IDDQ records, each of which is zero) so as to obtain N×M delta IDDQ records (i.e., [(N−1)×M]+M delta IDDQ records).

Figure 8:
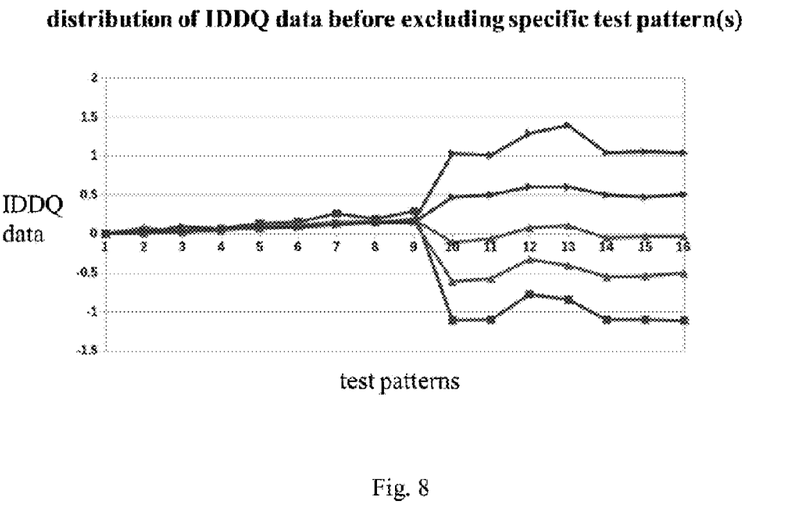
FIG. 8 shows a distribution of IDDQ data significantly affected by a specific test pattern.
Figure 9:
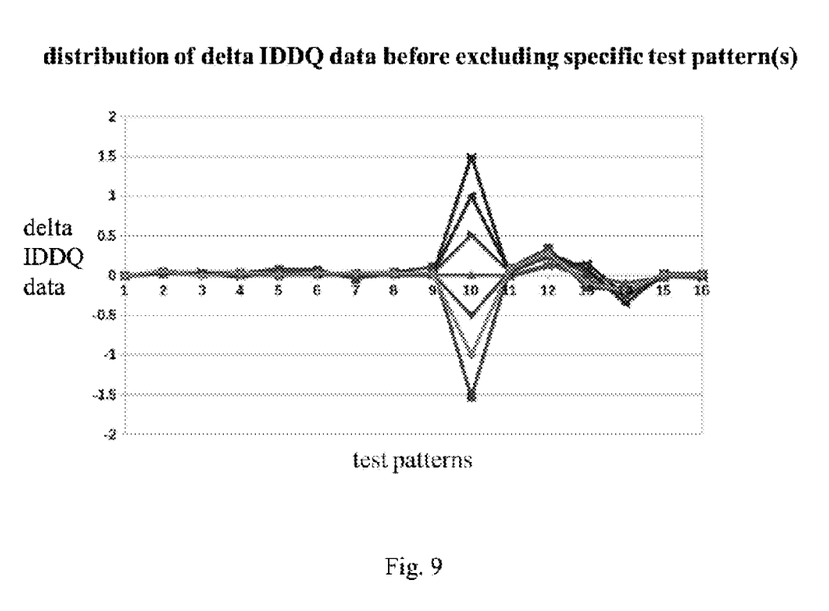
FIG. 9 shows a distribution of delta IDDQ data significantly affected by a specific test pattern.
Figure 10:
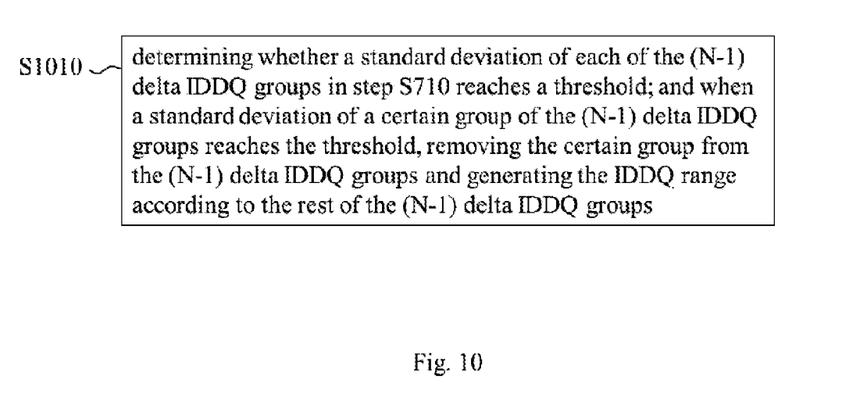
FIG. 10 shows an exemplary implementation of the step S420 of FIG. 4.
Figure 11:
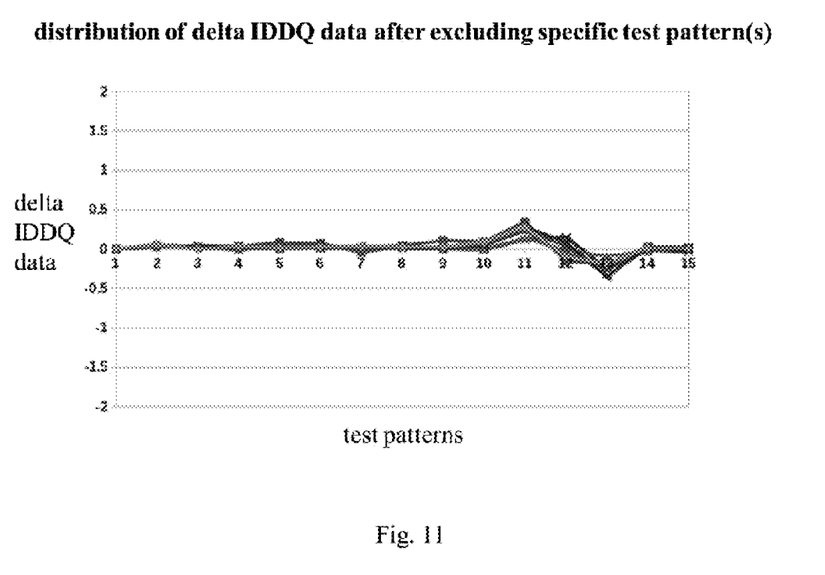
FIG. 11 shows a distribution of delta IDDQ data after excluding a specific test pattern.

FIG. 8 shows an exemplary IDDQ distribution and FIG. 9 shows an exemplary delta IDDQ distribution; FIG. 8 and FIG. 9 are based on the same IDDQ data. As shown in FIG. 8 and FIG. 9, since one or more specific test pattern(s) contribute(s) dominant influence, the IDDQ distribution of FIG. 8 diverges along the transverse axis after the specific test pattern(s), and the delta IDDQ distribution of FIG. 9 has a wide range for the specific test pattern(s) (i.e., the pattern of number 10). These features indicate that the specific test pattern(s) will seriously affect the decision of the aforementioned IDDQ range and thus make the decision unreliable. In order to prevent this problem, as shown in FIG. 10, an embodiment of step S420 includes:

Step S1010: determining whether a standard deviation of each of the (N−1) delta IDDQ groups in step S710 reaches a threshold (e.g., greater than or equal to the threshold); and when a standard deviation of a certain group of the (N−1) delta IDDQ groups reaches the threshold, removing the certain group from the (N−1) delta IDDQ groups and generating the IDDQ range according to the rest of the (N−1) delta IDDQ groups (i.e., group(s) of the (N−1) delta IDDQ groups that is/are not removed). The delta IDDQ distribution without the certain group(s) is shown in FIG. 11. In comparison with FIG. 9, FIG. 11 excludes the dominant influence caused by the specific pattern(s), and therefore provides a more reliable result. In an embodiment, the said threshold can be obtained through the following steps: calculating a standard deviation of each of the (N−1) delta IDDQ groups, and thereby obtaining (N−1) standard deviations; generating the threshold according to an average of the (N−1) standard deviations and according to K times a standard deviation of the (N−1) standard deviations, in which the K is an integer or a fraction. An example of the K is a positive number; another example of the K is a negative number provided that an implementation with such K is practicable. For instance, the threshold is equal to the average of the (N−1) standard deviations plus K times the standard deviation of the (N−1) standard deviations, in which the K is between one and three.

It should be noted that the distribution and/or the analysis of records may optionally make use of normalization. Since the use of normalization is known in this industrial field, its detail is omitted here.

Figure 12:
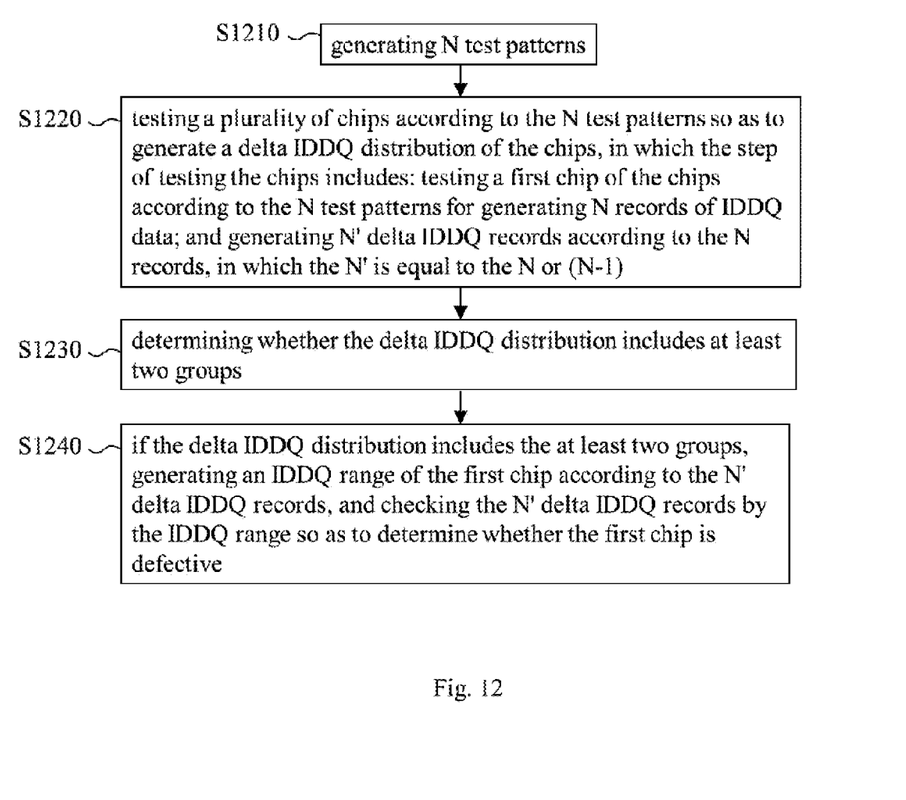
FIG. 12 shows another embodiment of the IC test method of the present invention.

In consideration of that one and only IDDQ range may be unsuitable for some specific test pattern(s), the present invention provides another embodiment of the IC test method as shown in FIG. 12. In comparison with the embodiment of FIG. 1, this embodiment determines an IDDQ range for each test pattern individually (i.e., N IDDQ ranges for N test patterns respectively) rather than reorders test patterns. As shown in FIG. 12, the embodiment includes the following steps:

Step S1210: generating N test patterns, in which the N is an integer greater than one. In an exemplary implementation of this step, an ATPG is used to generate the N test patterns and output them to an ATE.

Step S1220: testing a plurality of chips according to the N test patterns so as to generate a delta IDDQ distribution of the chips. The step of testing the chips includes: testing a first chip of the chips according to the N test patterns for generating N records of IDDQ data; and generating N' delta IDDQ records according to the N records, in which the N' is equal to the N or (N−1). Each of the other chip(s) is tested for generating its delta IDDQ records in the manner of testing the first chip, so that the whole delta IDDQ records compose the delta IDDQ distribution of the chips. Step S1220 can be carried out by the aforementioned ATE or the equivalent thereof.

Figure 13:
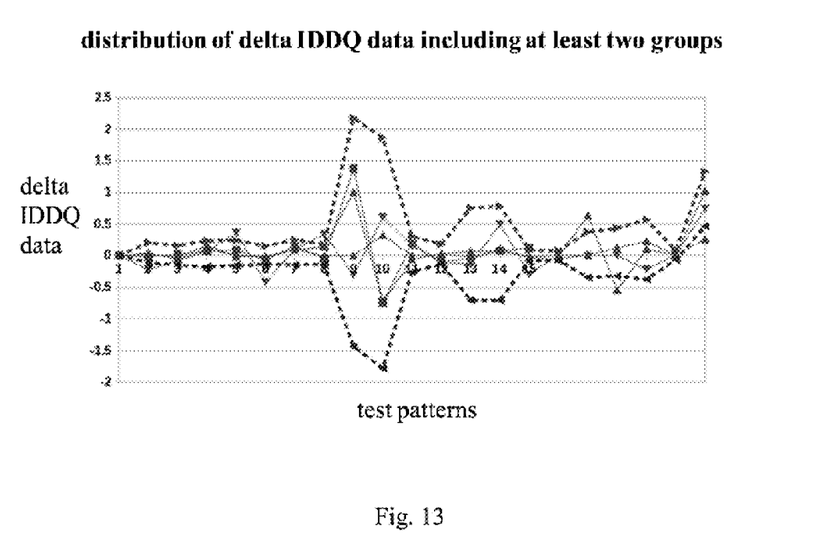
FIG. 13 shows a distribution of delta IDDQ data including at least two groups.

Step S1230: determining whether the delta IDDQ distribution includes at least two groups. In this step, for the same test pattern, the difference between the delta IDDQ records of any two chips in the same group is less than the difference between the delta IDDQ records of any two chips in different groups. For instance, as shown in FIG. 13, the delta IDDQ distribution obviously includes at least two groups under some test patterns, in which the at least two groups include a first group and a second group, P chip(s) of the total chips belong(s) to the first group, Q chip(s) of the total chips belong(s) to the second group, each of the P and the Q is not less than the 30%~40% of the number of the total chips, and both the P and the Q are positive integers.

Step S1240: if the delta IDDQ distribution includes the at least two groups, generating an IDDQ range of the first chip according to the N' delta IDDQ records, and checking the N' delta IDDQ records by the IDDQ range so as to determine whether the first chip is defective. The way to determine whether the first chip is defective is applicable to the other chips.

Since people of ordinary skill in the art can appreciate the detail and modification of the embodiment of FIG. 12 by referring to the description for the embodiments of FIG. 1, FIG. 4, FIG. 7, etc., which means that the features of the aforementioned embodiments are applicable to this embodiment in a reasonable way, repeated and redundant explanation is omitted.

To sum up, the IC test method of the present invention can do analysis according to a reference order of test patterns so as to accurately determine whether an IC is defective. In addition, when a delta IDDQ distribution includes at least two groups, the IC test method of the present invention can determine an IDDQ range for each test pattern individually and thus make analysis reliable.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An integrated circuit (IC) test method including:
generating N test patterns, in which the N is an integer greater than one;
testing each of M chip(s) according to the N test patterns so as to generate N×M records, in which the N×M records are quiescent DC current (IDDQ) data and the M is a positive integer;
generating a reference value according to M record(s) of the N×M records for each of the N test patterns and thereby obtaining N reference values, in which the M record(s) and the reference value generated thereupon are related to a same one of the N test patterns;
obtaining a reference order of the N test patterns according to the N reference values and a predetermined sorting rule;
reordering the N×M records by the reference order so as to obtain reordered N×M records;
generating an IDDQ range according to the reordered N×M records; and
determining whether any of the M chip(s) is defective based on the IDDQ range.

2. The IC test method of claim 1, wherein the step of generating the IDDQ range includes:
generating N'×M delta IDDQ records according to the reordered N×M records, in which each of the N'×M delta IDDQ records is generated according to a difference between adjacent two of N records of the reordered N×M records related to a same one of the M chip(s), and the N' is equal to the N or (N−1); and
generating the IDDQ range according to the N'×M delta IDDQ records.

3. The IC test method of claim 2, wherein the step of generating the IDDQ range further includes:
 generating the IDDQ range according to an average of the N'×M delta IDDQ records and according to K times a standard deviation of the N'×M delta IDDQ records, in which the K is an integer or a fraction.

4. The IC test method of claim 2, wherein the step of generating the N'×M delta IDDQ records includes:
 subtracting M record(s) of the reordered N×M records related to a $(X-1)^{th}$ test pattern of the N test patterns from M record(s) of the N×M reordered records related to an $X^{th}$ test pattern of the N test patterns respectively so as to obtain a delta IDDQ group including M delta IDDQ record(s) of the N'×M delta IDDQ records, and accordingly obtaining (N−1) delta IDDQ groups including (N−1)×M delta IDDQ records of the N'×M delta IDDQ records based on all options of the X, in which the X is an integer between one and the N, and an order of the $(X-1)^{th}$ test pattern and the $X^{th}$ test pattern complies with the reference order of the N test patterns; and
 if the N' is equal to the N, supplementing the (N−1)×M delta IDDQ records with predetermined M delta IDDQ records so as to obtain N×M delta IDDQ records.

5. The IC test method of claim 4, further comprising:
 determining whether a standard deviation of each of the (N−1) delta IDDQ groups reaches a threshold; and
 when a standard deviation of a certain group of the (N−1) delta IDDQ groups reaches the threshold, removing the certain group from the (N−1) delta IDDQ groups and generating the IDDQ range according to group(s) of the (N−1) delta IDDQ groups that is/are not removed.

6. The IC test method of claim 5, wherein the threshold is generated according to following steps:
 calculating the standard deviation of each of the (N−1) delta IDDQ groups, and thereby obtaining (N−1) standard deviations;
 generating the threshold according to an average of the (N−1) standard deviations and according to K times a standard deviation of the (N−1) standard deviations, in which the K is an integer or a fraction.

7. The IC test method of claim 1, wherein the step of generating the reference value includes:
 generating the reference value according to an average of the M record(s) and according to K times a standard deviation of the M record(s), in which the K is an integer or a fraction.

8. The IC test method of claim 1, wherein the predetermined sorting rule is one of an ascending sorting rule and a descending sorting rule.

9. An integrated circuit (IC) test method including:
 generating N test patterns, in which the N is an integer greater than one;
 testing chips according to the N test patterns so as to generate a delta quiescent DC current (IDDQ) distribution of the chips, in which the step of testing the chips includes:
  testing a first chip of the chips according to the N test patterns and thereby generating N records of IDDQ data; and
  generating N' delta IDDQ records according to the N records, wherein the N' is equal to the N or (N−1);
 determining whether the delta IDDQ distribution includes at least two groups; and
 if the delta IDDQ distribution includes the at least two groups, generating an IDDQ range of the first chip according to the N' delta IDDQ records, and checking the N delta IDDQ records by the IDDQ range so as to determine whether the first chip is defective.

10. The IC test method of claim 9, wherein the at least two groups include a first group and a second group, P chip(s) of the chips belong(s) to the first group, Q chip(s) of the chips belong(s) to the second group, each of the P and the Q is not less than 30% of a total number of the chips, and both the P and the Q are positive integers.

* * * * *